US011897091B2

(12) United States Patent
Thompson

(10) Patent No.: US 11,897,091 B2
(45) Date of Patent: Feb. 13, 2024

(54) RATCHET WRENCH WITH TUBE SPRING

(71) Applicant: Snap-on Incorporated, Kenosha, WI (US)

(72) Inventor: Christopher D. Thompson, Franklin, WI (US)

(73) Assignee: Snap-on Incorporated, Kenosha, WI (US)

( * ) Notice: Subject to any disclaimer, the term of this patent is extended or adjusted under 35 U.S.C. 154(b) by 370 days.

(21) Appl. No.: 16/221,863

(22) Filed: Dec. 17, 2018

(65) Prior Publication Data

US 2020/0189075 A1 Jun. 18, 2020

(51) Int. Cl.
*B25B 13/46* (2006.01)
*B25B 23/00* (2006.01)

(52) U.S. Cl.
CPC ........ *B25B 13/463* (2013.01); *B25B 23/0007* (2013.01)

(58) Field of Classification Search
CPC ... B25B 13/463; B25B 13/462; B25B 13/465; B25B 13/46; B25B 23/0007
USPC .............................................. 81/62, 60, 63.1
See application file for complete search history.

(56) References Cited

U.S. PATENT DOCUMENTS 5,233,891 A 8/1993 Arnold et al.
5,613,585 A * 3/1997 Tiede ...................... F16D 41/16 81/62
5,687,623 A 11/1997 Hsieh
5,771,760 A 6/1998 Tiede
5,778,743 A 7/1998 Tiede
6,279,428 B1 * 8/2001 Huang .................. B25B 13/463 192/43.2
6,520,051 B1 2/2003 Hu
6,722,234 B2 4/2004 Hu
6,748,825 B2 6/2004 Hsu
7,080,579 B2 * 7/2006 Chen ..................... B25B 13/463 81/62
7,146,883 B2 12/2006 Chen
7,299,720 B1 11/2007 Schultz et al.
7,836,798 B2 11/2010 Hu
7,921,751 B2 4/2011 Hu
7,987,747 B2 * 8/2011 Ross ..................... B25B 13/463 81/62
8,210,073 B2 7/2012 Hu
8,250,947 B2 8/2012 Hu
(Continued)

FOREIGN PATENT DOCUMENTS

CN 200963800 Y 10/2007
CN 201423586 Y 3/2010
(Continued)

OTHER PUBLICATIONS

Examination Report No. 1 for Application No. 2019204368 dated Apr. 20, 2020, 6 pages.
(Continued)

*Primary Examiner* — Bryan R Muller
*Assistant Examiner* — Michael A Gump
(74) *Attorney, Agent, or Firm* — Seyfarth Shaw LLP

(57) ABSTRACT

A pawl mechanism with a bias member that biases the pawl into engagement with the drive gear. The bias member can be a tube spring disposed within a bore to bias the pawl into engagement with the drive gear while eliminating the need for a spacer, as required by prior art ratchet wrenches.

16 Claims, 3 Drawing Sheets

(56) References Cited

U.S. PATENT DOCUMENTS

| | | | | |
|---|---|---|---|---|
| 8,499,666 | B2 * | 8/2013 | Hopper | B25B 13/463 81/63.1 |
| 9,038,507 | B2 * | 5/2015 | Thompson | B25B 13/463 81/62 |
| 9,956,671 | B2 | 5/2018 | Li | |
| 2005/0000325 | A1 | 1/2005 | Hsien | |
| 2008/0006125 | A1 * | 1/2008 | Chen | B25B 13/463 81/63.1 |
| 2011/0113930 | A1 | 5/2011 | Liao | |
| 2011/0132149 | A1 * | 6/2011 | Lee | B25B 13/463 81/63.1 |
| 2011/0138971 | A1 | 6/2011 | Chan | |
| 2011/0162489 | A1 * | 7/2011 | Huang | B25B 13/463 81/63.1 |
| 2013/0036874 | A1 | 2/2013 | Chan | |
| 2013/0213190 | A1 | 8/2013 | Chen | |
| 2015/0165600 | A1 * | 6/2015 | Wu | B25B 13/463 81/60 |
| 2017/0059021 | A1 * | 3/2017 | Thompson | B25B 13/46 |
| 2017/0203415 | A1 * | 7/2017 | Li | B25B 13/463 |

FOREIGN PATENT DOCUMENTS

| | | | |
|---|---|---|---|
| CN | 201559150 | | 8/2010 |
| CN | 201685211 | U | 12/2010 |
| CN | 203804858 | U | 9/2014 |
| CN | 106239413 | A | 12/2016 |
| DE | 20119261 | U1 | 1/2002 |
| TW | 530721 | | 5/2003 |
| TW | 587508 | | 5/2004 |
| TW | M247350 | | 10/2004 |
| TW | I245684 | | 12/2005 |
| TW | I249455 | | 2/2006 |
| TW | I252143 | | 4/2006 |
| TW | M323961 | | 12/2007 |
| TW | M374388 | | 2/2010 |
| TW | M492810 | | 1/2015 |
| TW | I511845 | | 12/2015 |
| TW | M523547 | | 6/2016 |
| TW | I586491 | | 6/2017 |
| TW | M559222 | | 5/2018 |
| TW | I628050 | | 7/2018 |

OTHER PUBLICATIONS

Taiwan Office Action for Application No. 10920372000 dated Apr. 23, 2020, 5 pages.

Canadian Examiner's Report for Application No. 3,050,647 dated Sep. 10, 2020, 3 pages.

UK Combined Search and Examination Report dated Dec. 16, 2019, 8 pages.

Chinese Office Action for Application No. 201910866350.9 dated Jan. 22, 2021, 8 pages.

Examination Report for Application No. GB1909532.2 dated Feb. 5, 2021, 3 pages.

Examination Report for Application No. 2019204368 dated Nov. 2, 2020, 4 pages.

Examination Report for corresponding United Kingdom Application No. GB1909532.2 dated Jun. 8, 2021, 3 pages.

Office Action for corresponding Chinese Application No. 201910866350.9 dated Aug. 13, 2021, 8 pages.

* cited by examiner

RATCHET WRENCH WITH TUBE SPRING

TECHNICAL FIELD OF THE INVENTION

The presently invention relates generally to ratchet wrenches. More particularly, the present invention relates to ratchet wrenches having a tube spring bias member.

BACKGROUND OF THE INVENTION

Ratchet wrenches are common hand tools used to apply torque to work pieces. Ratchet wrenches include a pawl mechanism that allows the tool to torque a work piece in a first rotational direction by rotating the tool in that rotational direction, and then return the tool to its original position by rotating the tool in a second rotational direction opposite the first rotational direction. The pawl mechanism engages a drive gear to impart the torque in the first rotational direction, but allows the pawl to slip relative to the drive gear in the second rotational direction. A reversing lever can reverse which of the first and second rotational directions applies torque to the work piece, for example, if the work piece is left hand threaded or if the user is using the tool to remove the work piece from its position.

Two pawl ratchet wrenches require the pawl to disengage the gear in order to ratchet. Typically this requires the gear to rotate an angle equal to about two to three times the tooth pitch of the pawl teeth. Past wrenches attempt to solve this problem by including a bias member that urges the pawl into engagement with the drive gear, but this arrangement requires a spacer (such as spacer 140 described in U.S. Pat. No. 8,499,666, for example) for the spring to pivot and sit within.

SUMMARY OF THE INVENTION

The present invention broadly comprises a pawl mechanism with a tube spring as the bias member that biases the pawl into engagement with the drive gear. By biasing the pawl into the drive gear, the tube spring limits lost motion in the engaging pawl. Further, by using a tube spring, a spacer such as spacer 140 described in U.S. Pat. No. 8,499,666, for example) is not needed and instead the tube spring can be disposed in a circular bore.

For example, the present invention broadly comprises a tool including a handle, a head extending from the handle, where the head has first and second bores defined therein. A drive gear is disposed within the head and provides torque to work pieces, and first and second pawls engage the drive gear. A reversing lever is provided and is coupled to the first and second pawls and causes either the first or second pawl to engage the drive gear depending on a position of the reversing lever. First and second tube springs are disposed within the first and second bores. The first and second bores respectively include first and second arcs respectively allowing the first and second tube springs to extend toward the first and second pawls. When the first pawl engages the drive gear, the first tube spring biases the first pawl into engagement with the drive gear, and when the second pawl engages the drive gear, the second tube spring biases the second pawl into engagement with the drive gear.

A ratchet mechanism is further provided and includes first and second pawls adapted to engage a drive gear in an engaging rotational direction and slip about the drive gear in a slip rotational direction. The mechanism can include a reversing lever coupled to the first and second pawls and adapted to cause either the first or second pawl to engage the drive gear depending on a position of the reversing lever. First and second tube springs are disposed within first and second bores of a head of a tool. The first and second bores respectively include first and second arcs respectively allowing the first and second tube springs to extend toward the first and second pawls. When the first pawl engages the drive gear, the first tube spring biases the first pawl into engagement with the drive gear, and when the second pawl engages the drive gear, the second tube spring biases the second pawl into engagement with the drive gear.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
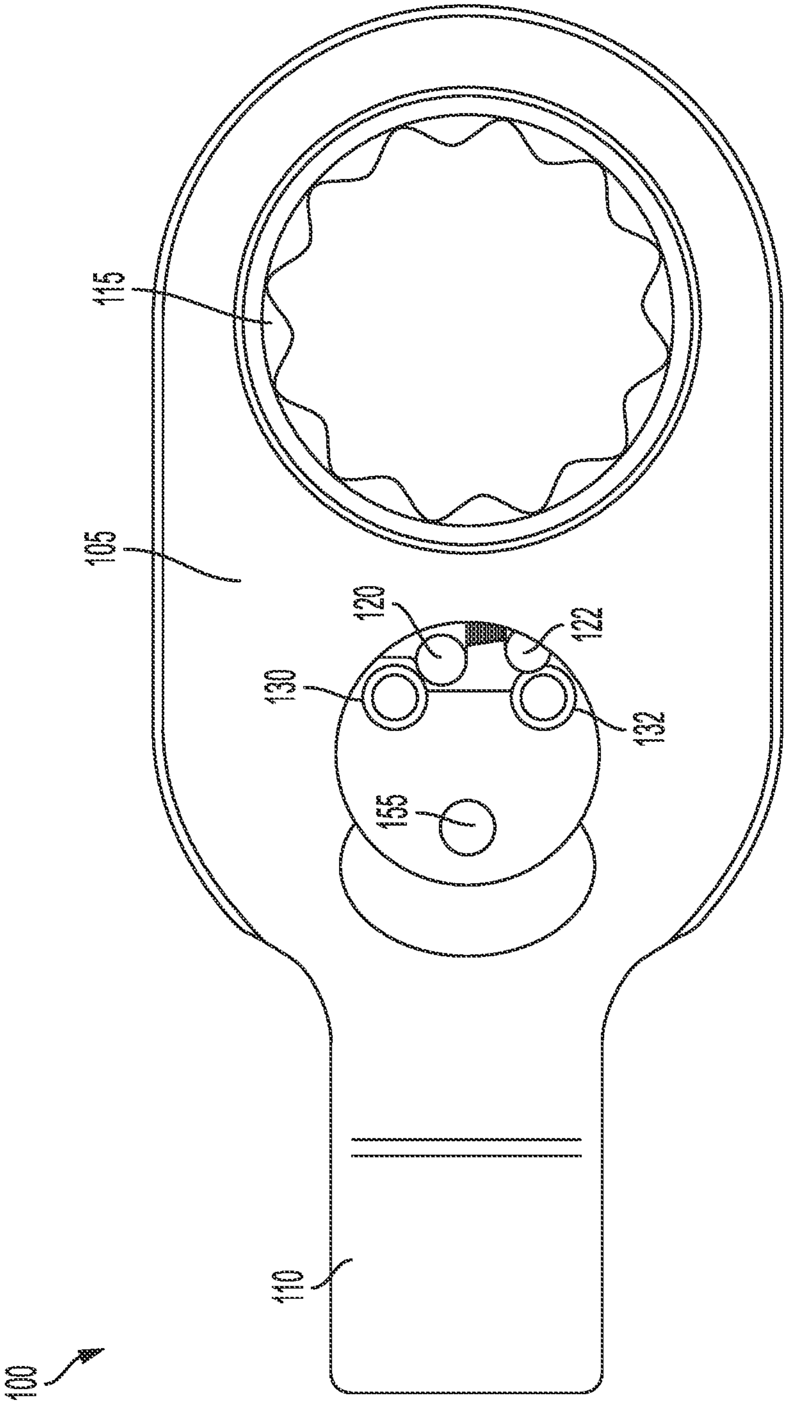
FIG. 1 is a top view of a ratchet wrench according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a pawl mechanism with a bias member that biases the pawl into engagement with the drive gear. For example, the bias member can be a tube spring disposed within a bore. By biasing the pawl into the drive gear, the bias member limits lost motion in the engaging pawl; and by using a tube spring, a spacer is not needed and instead the tube spring can be disposed in a circular bore.

Figure 2:
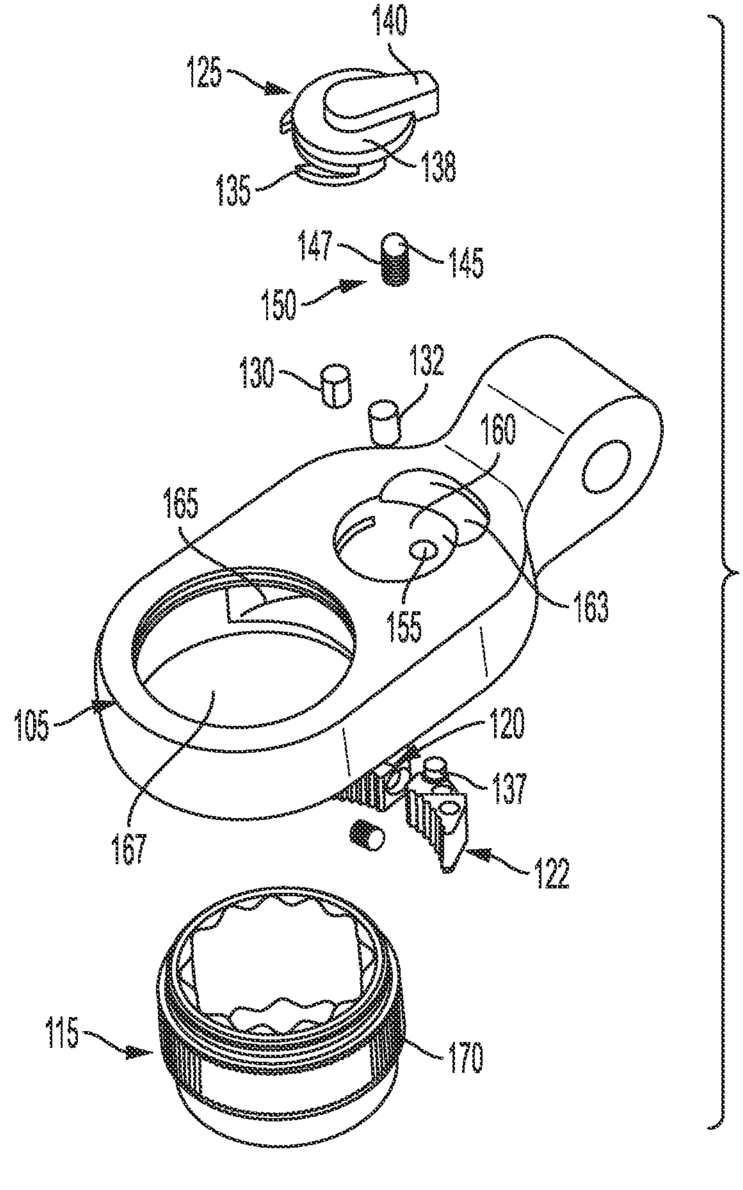
FIG. 2 is a top perspective exploded view of the ratchet wrench according to at least some embodiments of the presently disclosed embodiments.

As shown in FIGS. 1 and 2, at least some of the presently disclosed embodiments include a tool 100 having a head 105 and a handle 110 extending from the head 105. A drive gear 115 can be disposed within the head 105 to apply torque to a work piece. First 120 and second 122 pawls can also be disposed in the head 105 to engage the drive gear 115 when the drive gear 115 is rotated in a drive rotational direction, and to slip with respect to the drive gear 115 when the drive gear 115 is rotated in a slip rotational direction opposite the drive rotational direction. A reversing lever 125 can be implemented to allow the user to choose either the clockwise or counterclockwise direction as the drive rotational direction, and vice versa for the slip rotational direction.

Figure 3:
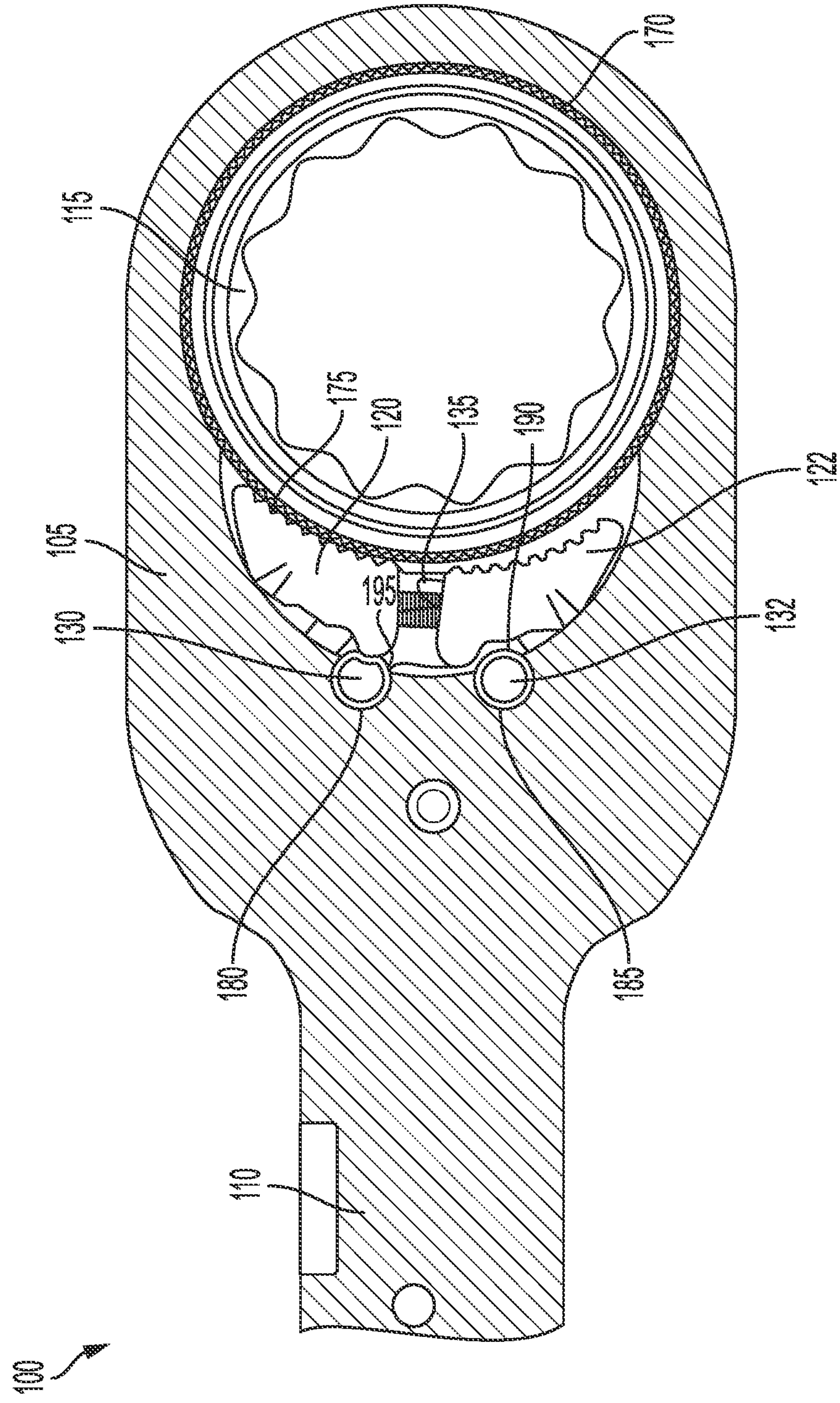
FIG. 3 is a bottom sectional view of a ratchet wrench according to at least some of the presently disclosed embodiments.

As discussed above, the pawls 120, 122 can incur lost motion when engaging the drive gear 115 unless the engaging pawl 120, 122 is biased into engagement with the drive gear 115. For this reason, at least some of the presently disclosed embodiments implement first 130 and second 132 bias members to bias the engaging pawl 120, 122 into engagement with the drive gear 115. For example, the first bias member 130 can engage the first pawl 120 when the first pawl 120 is the engaging pawl, and the second bias member 132 can engage the second pawl 122 when the second pawl 122 is the engaging pawl. FIG. 3 illustrates one such example of the pawl mechanism where the non-engaging second pawl 122 "clears" its bias member (the second bias member 132 as shown in FIG. 3) when the engaging first pawl 120 engages the drive gear 115. Here, the first bias member 130 biases the first pawl 120 into engagement with the drive gear 115 to limit lost motion in the ratcheting operation.

As shown in FIGS. 2 and 3, the reversing lever 125 can include hooks 135 that engage posts 137 of the pawls 120, 122. For example, depending on how the reversing lever 125 is rotated, the hooks 135 will engage either the first 120 or second 122 pawl and allow the other first or second pawl 120, 122 to engage the drive gear 115. As known in the art, for example as described in U.S. Pat. No. 8,499,666, a bias member, such as a coil spring, can be disposed between the pawls 120, 122 to assist moving and biasing the pawls 120, 122 away from each other. FIG. 3 illustrates one such example where the hook 135 engages the second pawl 122, causing the second pawl 122 to "clear" its bias member (the second bias member 132 as shown in FIG. 3), and the first pawl 120 engages the drive gear 115. The reversing lever 125 can further include a body 138 and a knob 140 coupled to the body 138 to allow the user to impart rotational motion on the reversing lever 125 to thereby select a rotational engagement and slip direction for the tool 100.

The tool 100 can further include a ball 145 and spring 147, collectively referred to as a ball detent mechanism 150. The ball detent mechanism 150 sits within a hole 155 of the head 105 and is biased in the upward direction, toward the bottom of the reversing lever 125, as shown in FIG. 2. The reversing lever 125 can include partially-spherical divots that receive the ball 145 when the reversing lever 125 is rotated a permissible amount either clockwise or counterclockwise. The ball 145 can therefore provide a tactile indication to the user that the reversing lever 125 has reached the desired rotational engagement direction. As shown, the ball detent mechanism 150 is disposed within a hole 155 in a valley 160 of the head 105, but the ball detent mechanism 150 can be located in any location so long as it provides a tactile indication to the user when the desired rotational engagement direction is reached.

The head 105 can include various chambers and open areas to receive and house the mechanisms of the head 105. For example, the head 105 can include the valley 160, as discussed above, which can receive the ball detent mechanism 150 and also the reversing lever 125, for example the body 138 of the reversing lever 125. The valley 160 can further lead to a shelf 163 where the knob 140 of the reversing lever 125 rotates within so that the body 138 and the knob 140 can be located slightly below the top surface of the head 105. The head 105 can also include a pawl chamber 165 that receives the pawls 120, 122 of the tool 100, and a gear opening 167 that receives the drive gear 115.

As shown in FIGS. 2 and 3, the drive gear 115 can include gear teeth 170 that engage pawl teeth 175. These teeth 170, 175 engage in a biased relationship due to the force exerted by the bias member 130, 132 associated with the engaging pawl 120, 122 (the first bias member 130 and first pawl 120 as shown in FIG. 3). The bias members 130, 132 can be located within bores 180, 185 that are formed into the head 105. For example, as shown, the bores 180, 185 can be sized and located such that the bias members 130, 132 can extend partially outside of the bores 180, 185 and provide bias to the respective pawl 120, 122, but where the opening that allows the bias members 130, 132 to extend out of the bores 180, 185 is not large enough to permit the bias members 130, 132 to escape. For example, the bores 180, 185 can be circular openings where the arcs of the circle that are not cut into the head 105 can be referred to as the first 190 and second 195 arcs. These arcs can extend rotationally less than 180 degrees to retain the bias members 130, 132 within the bores 180, 185.

The bias members 130, 132 can be tube springs that impart bias onto the respective pawl 120, 122. In doing so, the bias members 130, 132 do not require a separate spacer (such as spacer 140 described in U.S. Pat. No. 8,499,666, for example) and can instead be disposed within the bores 180, 185. The tool 100 can therefore ratchet with limited lost motion while not requiring a spacer or other additional components.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool adapted to apply torque to a work piece, the tool comprising:

a handle;

a head extending from the handle, the head including first and second bores perpendicular to the head, the first and second bores respectively having first and second radial openings;

a drive gear disposed within the head and adapted to apply torque to the work piece;

first and second pawls adapted to engage the drive gear;

a reversing lever adapted to selectively allow either one of the first and second pawls to engage the drive gear; and first and second bias members respectively disposed within the first and second bores, the first and second bias members respectively radially extend partially out of the first and second radial openings and respectively towards the first and second pawls, wherein the first and second radial openings are smaller than the first and second bias members to restrict the first and second bias members from respectively moving completely radially out of the first and second bores, wherein when the first pawl engages the drive gear, the second pawl is disengaged from the second bias member, and the first bias member is radially compressed by the first pawl and biases the first pawl into engagement with the drive gear, and when the second pawl engages the drive gear, the first pawl is disengaged from the first bias member, and the second bias member is radially compressed by the second pawl and biases the second pawl into engagement with the drive gear.

2. The tool of claim 1, further comprising a ball detent mechanism disposed in the head and including a ball and a spring biasing the ball towards the reversing lever.

3. The tool of claim 2, wherein the head includes a valley and wherein the ball detent mechanism is located within a hole in the valley.

4. The tool of claim 1, wherein the head includes a valley and a shelf extending from the valley, and the reversing lever includes a knob and is adapted to rotate within the valley and the shelf.

5. The tool of claim 1, wherein the head includes a pawl chamber for housing the first and second pawls.

6. The tool of claim 1, wherein the first and second bores are substantially circular, and wherein each of the first and second radial openings is an arc that extends less than 180 degrees.

7. The tool of claim 1, wherein the bias members are tube springs.

8. The tool of claim 1, wherein the first pawl includes a first pawl protrusion and the second pawl includes a second pawl protrusion, and wherein when the first pawl engages the drive gear, the first bias member is engaged by the first pawl protrusion, and when the second pawl engages the drive gear, the second bias member is engaged by the second pawl protrusion.

9. A ratchet mechanism including a head, the ratchet mechanism comprising:

first and second pawls disposed in the head and adapted to selectively engage a drive gear; and first and second bias members respectively disposed within first and second bores formed in and perpendicular to the head, the first and second bores respectively including first and second radial openings respectively allowing the first and second bias members to respectively radially extend partially out of the first and second radial openings and respectively towards the first and second pawls, and wherein the first and second radial openings are smaller than the first and second bias members to restrict the first and second bias members from respectively moving completely radially out of the first and second bores, wherein when the first pawl engages the drive gear, the second pawl is disengaged from the second bias member, and the first bias member is radially compressed by the first pawl and biases the first pawl into engagement with the drive gear, and when the second pawl engages the drive gear, the first pawl is disengaged from the first bias member, and the second bias member is radially compressed by the second pawl and biases the second pawl into engagement with the drive gear.

10. The ratchet mechanism of claim 9, further comprising a reversing lever and a ball detent mechanism disposed in the head and including a ball and a spring biasing the ball towards the reversing lever.

11. The ratchet mechanism of claim 10, wherein the ball detent mechanism is located within a hole in a valley of the head.

12. The ratchet mechanism of claim 10, wherein the reversing lever includes a knob and is adapted to rotate within a valley and a shelf of the head.

13. The ratchet mechanism of claim 9, wherein the first and second pawls are housed in a pawl chamber of the head.

14. The ratchet mechanism of claim 9, wherein the first and second bores are substantially circular, and wherein each of the first and second radial openings is an arc that extends less than 180 degrees.

15. The ratchet mechanism of claim 9, wherein the bias members are tube springs.

16. The ratchet mechanism of claim 9, wherein the first pawl includes a first pawl protrusion and the second pawl includes a second pawl protrusion, and wherein when the first pawl engages the drive gear, the first bias member is engaged by the first pawl protrusion, and when the second pawl engages the drive gear, the second bias member is engaged by the second pawl protrusion.

* * * * *